United States Patent [19]
Rhee

[11] Patent Number: 5,524,137
[45] Date of Patent: Jun. 4, 1996

[54] MULTI-MEDIA MESSAGING SYSTEM

[75] Inventor: David R. Rhee, Old Bridge, N.J.

[73] Assignee: AT&T Corp., Murray Hill, N.J.

[21] Appl. No.: 131,174

[22] Filed: Oct. 4, 1993

[51] Int. Cl.⁶ .................................................. H04M 1/64
[52] U.S. Cl. ............................ 379/67; 379/93; 379/100; 379/89; 364/419.16; 434/156
[58] Field of Search ................................ 379/67, 88, 89, 379/90, 93, 94, 96, 100; 364/419.01, 419.02, 419.03, 419.16, 419.07; 434/156, 157, 169

[56] References Cited

U.S. PATENT DOCUMENTS

| | | | |
|---|---|---|---|
| 4,882,681 | 11/1989 | Brotz | 364/419 |
| 4,958,366 | 9/1990 | Hashimoto | 379/77 |
| 5,146,488 | 9/1992 | Okada et al. | 379/88 |
| 5,163,081 | 11/1992 | Wycherley et al. | 379/88 |
| 5,333,266 | 7/1994 | Boaz et al. | 379/89 |

*Primary Examiner*—Jeffery Hofsass
*Assistant Examiner*—Fan Tsang
*Attorney, Agent, or Firm*—John A. Caccuro

[57] ABSTRACT

A multi-media messaging system enables a user to select the communication format for communications between the system and the user. This enables the user to direct the system to convert the communication format of a stored message for the user from a first format (e.g. video) to a second format (e.g. audio). Another feature enables a user to change the language of the outputted message to be different from the language of the stored message. The system also enables a user to input a message in a first language and have the system translate it to a second language and then store it at a user selected location in memory.

5 Claims, 4 Drawing Sheets

LEAVE MESSAGES

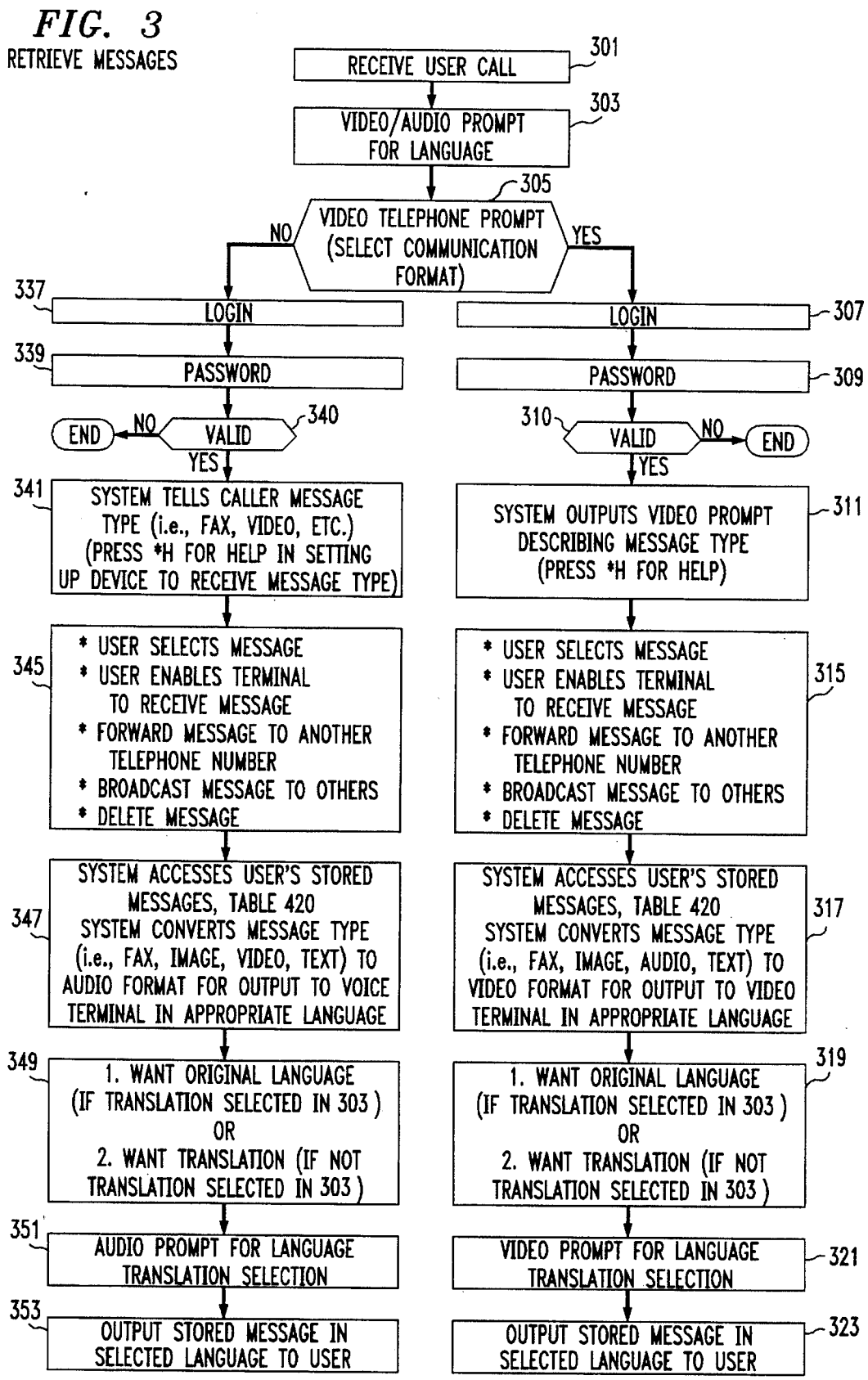

FIG. 4

LANGUAGE VIDEO MENU PROMPT TABLE 400

```
1. ENGLISH
2. SPANISH
3. FRENCH
4. GERMAN
5. JAPANESE
6. CHINESE
   ⋮
*H HELP
```

MESSAGE TYPE PROMPT TABLE 410

```
MESSAGE TYPE PROMPT
   IF AUDIO MESSAGE PRESS 1
   IF FAX MESSAGE PRESS 2
   IF IMAGE MESSAGE PRESS 3
   IF VIDEO MESSAGE PRESS 4
   IF TEXT MESSAGE PRESS 5
```

TABLE 420

| USER | MESSAGE NO. | MESSAGE TYPE | LANGUAGE TYPE | MESSAGE |
|---|---|---|---|---|
| USER 1 | 1 | V | E | ~~~ |
|  | 1 | V | F | ~~~ |
|  | 2 | A | E | ~~~ |
|  | 3 | A | E | ~~~ |
| ⋮ | ⋮ | ⋮ | ⋮ | ⋮ |
| USER n | 1 | V | E | ~~~ |
|  | 2 | V | E | ~~~ |

TABLE 430

| TERMINAL ID | COMMUNICATION FORMAT | LANGUAGE TYPE |
|---|---|---|
| 120 | A,F,I,V | E |
| 130 | A,V | F |
| 140 | A,F,I | E |

MULTI-MEDIA MESSAGING SYSTEM

TECHNICAL FIELD

This invention relates to message service systems and, more particularly, to a multi-media messaging system for use with a switching system.

BACKGROUND OF THE INVENTION

Message services is the term used to collectively identify the various office automation systems associated with a telephone switching system. These systems are used to improve the productivity of the white collar worker in an office environment by providing improved voice and text message communications.

The Voice Mail Service (VMS) is one example of these message services. The voice messaging system offers two distinct communication features: Voice Mailbox (VM) and Call answering (CA). The voice mailbox feature involves a telephone user calling the voice messaging system by dialing an access code using the touch-tone pad on the station set, identifying one or more message recipients who are also connected to the PBX by dialing their station numbers using the touchtone pad, and leaving a voice message for later delivery by the voice messaging system to the designated recipients. The delivery of the voice message may be immediate or at a scheduled time specified by the message originator. The delivery is passive in that the voice mail service system places the message in a mailbox assigned to each identified recipient and activates the recipient's message waiting indicator on his/her telephone set instead of actively calling the recipient to playback the message.

The call answering feature of voice messaging is geared to the convenience of the message recipient, unlike the voice mailbox feature which is geared towards aiding the message originator. The nonavailability of an individual to answer a telephone call results in that call being redirected to the voice messaging system call answering feature. The user receives a prerecorded message from the absent individual and can then leave a voice message in the absent individual's voice mailbox.

While present voice messaging systems permit the manipulation of voice and text messages among the users, these systems have yet to be applied to other forms of communication mediums (e.g., fax, image and video transmission).

SUMMARY OF THE INVENTION

The inventive multi-media messaging system, in response to a user's call to the system, prompts the user to select a communication format for communications between said system and the user. The system obtains a stored message for the user, converts the message to the user selected communication format and outputs it to the user. According to another feature, the system enables the user to select the language of the selected communication format. Another aspect of the invention enables a user's input message to be received in a first language, translated into a second language and stored in memory at a user selected location.

BRIEF DESCRIPTION OF THE DRAWING

FIG. 3 shows a flow diagram illustrating the steps required for a user to retrieve a message from the system of FIG. 1 and FIG. 4 shows a language video menu prompt, a communication format selection prompt, and a table for storing user messages.

DETAILED DESCRIPTION

Figure 1:
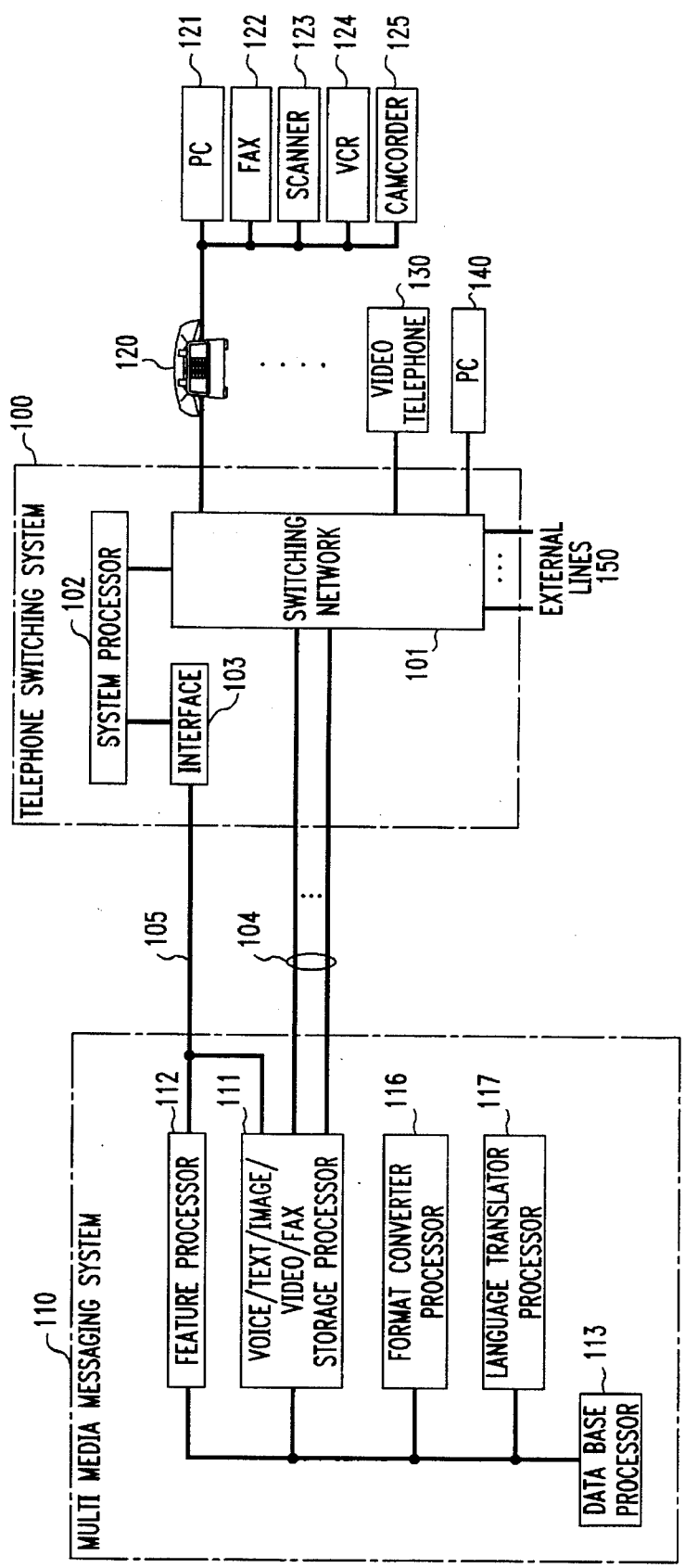
FIG. 1 illustrates a block diagram of the multi-media messaging system and its connection to a telephone switching system and a plurality of users.

My inventive multi-media messaging system and the business communication of which it is a part is shown in block diagram form in FIG. 1. One part of this business communication system is a stored program controlled telephone switching system 100 which provides business communication services to a plurality of subscriber terminal apparatus, illustratively, including telephone station 120, video terminal 130 and personal computer (PC) 140. Included in telephone switching system 100 is a switching network 101 for establishing communication connections among the various users which are connected via external lines 150 or connected via terminal apparatuses 120–140. A system processor 102 controls the operation of telephone switching system 100. The business communication system of FIG. 1 includes multi-media messaging system 110 for electronically storing and forwarding voice, text, image, video and facsimile messages.

Telephone switching system 100 provides each user with access to the multi-media messaging system 110. Users can directly call multi-media messaging system 110 or can redirect their incoming calls to it. Telephone switching system 100 provides a data communication interface unit 103 and a data link 105 connection to multi-media messaging system 110 to exchange call related information (as a data message) such as: new call, call disconnect, message waiting indication control, etc.

In telephone switching system 100, system processor 102 maintains a record of the location of messages for each user in telephone switching system 100. The data message that is transmitted by system processor 102 to voice storage processor 111 via data communication interface unit 103 and data link 105 on the initial call connection to multi-media mail service system 110 includes data relating to the presence/absence of messages stored at the multi-media messaging system 110 for the user at telephone station set 120.

The multi-media messaging system 110 includes feature processor 112, multi-media storage processor 111, database processor 115, format converter processor 116 and language translator processor 117. Feature processor 112 provides the overall control for messaging system 110 and performs various system level features associated with multi-media messaging system 110 described in the flow charts of FIGS. 3 and 4. The database processor 113 serves as a mass storage element to store all the digitally encoded multi-media messages as well as control algorithms used by multi-media storage processor 111 and feature processor 112.

The multi-media storage processor 111 operates under control of feature processor 112 to retrieve the appropriate prerecorded audio announcements and video menu messages from database processor 113 and provides them to the user. The multi-media storage processor 111 also administers the multi-media message and keeps track of the current multi-media message being outputted to or received from a user.

The format converter processor 116 operates under control of feature processor 112, to convert the communication format of a stored message to a format selected by the user. For example, a user may select to receive a video format message in audio format.

The language translator processor 117 operates under control of feature processor 112 to convert the language of a user message to a second language which the user has determined should be stored by the system. Additionally, the language translator processor 117 converts the language of previously stored messages to a second language selected by a message recipient user.

Figure 2:
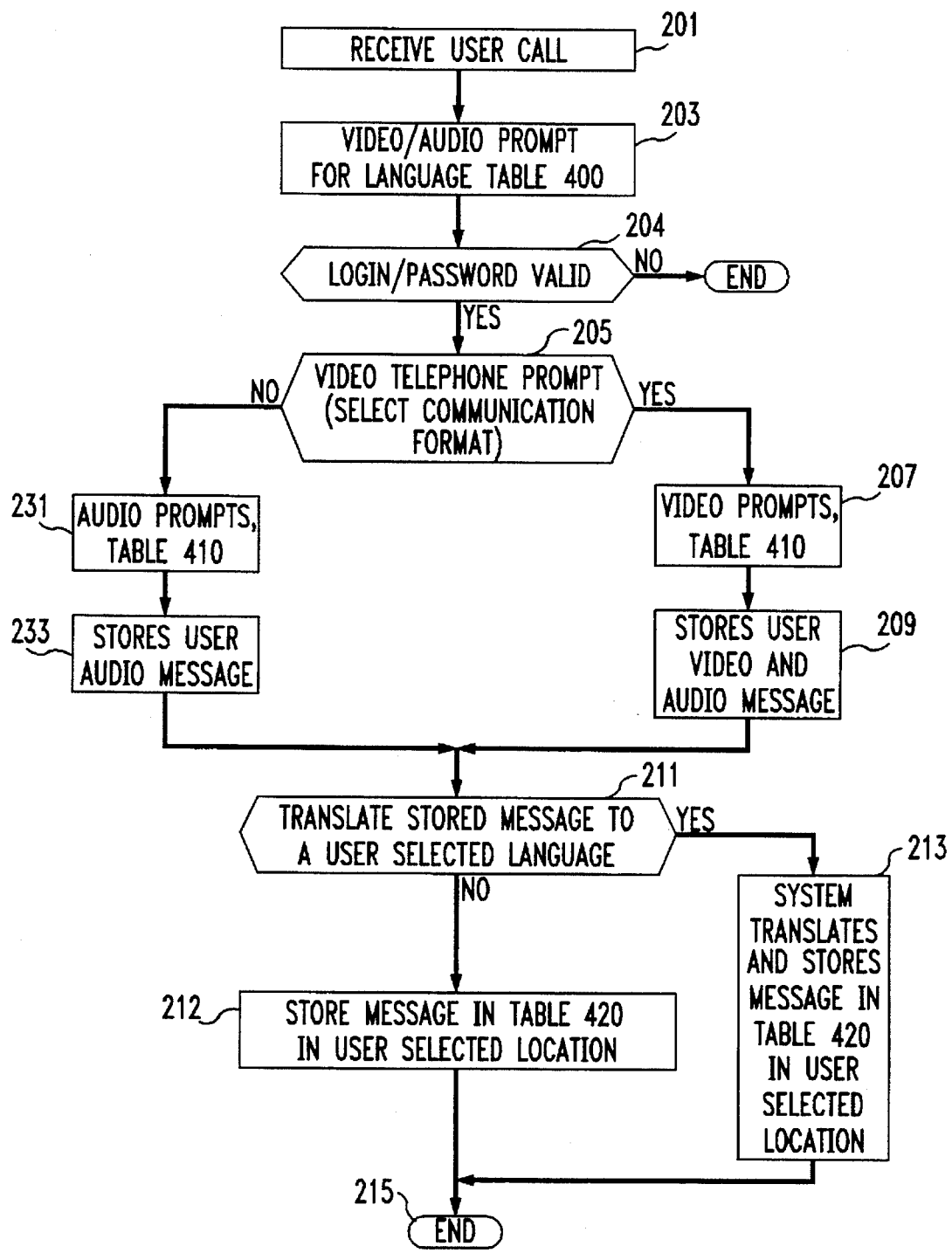
FIG. 2 shows a flow diagram illustrating the steps required for a user to leave a message with the system of FIG. 1.

With reference to FIG. 2 we describe the operation by which a user can leave a message to a multi-media messaging system in accordance with the present invention.

In step 201 a user desiring to leave a multimedia message calls the system.

In step 203 the system outputs a video/audio prompt to enable a user to select a language for subsequent video/audio prompts to the user. The language video menu prompt is shown by table 400 of FIG. 4. Alternatively, the system can be arranged to determine the language by accessing an administrative table 430 which identifies the user's station number and the user's preferred language. This is shown in table 430 where, for example, terminal 130 identifies French (F) as its language. In table 430 the terminals are associated with the type of communication formats available at that terminal. Thus, for example, terminal 120 can receive audio (A), facsimile (F), image and text (I) and video (V). The system may identify terminals using ICLID, ANI or other stored information in a database.

Additionally, the system may include a user table 420 which identifies users using their login/password identification and which associates message type and language type information with each user.

In step 204, the system checks the user's login/password. If not valid, then the procedure ends. If valid, then step 205 is performed.

In step 205 the system audio prompts the user to identify if he/she is at a video terminal. This enables the user to select the communication format (audio or video in this example) for communications between the user and the system. These audio prompts are shown in table 410. Alternatively, the system can interactively determine the terminal type by communicating with the terminal. Additionally, the terminal type could also be determined by accessing an administrative table 430, as previously described, to identify the terminal type. Optionally, step 203 could be performed following step 205 so that the system would use video prompts to determine which language the user (also referred to herein as a caller) could select.

If the answer to step 205 is yes, then in step 207 the system outputs video menu prompts. Shown in FIG. 4, table 410, is an illustrative video menu prompt which enables a user to select audio, facsimile, image, video or text messages for storage by selecting the appropriate item in table 410. Optionally, the system can be arranged to identify the source of the messages to be stored in real time from signals or protocols sent from the user's apparatus. Thus, if a user at telephone station 120 desired to send a facsimile message the system could determine that fact from the protocol signaling used by the facsimile machine 122. In a similar manner the system would be able to determine if an image message is to be stored from the signaling or protocol received from a scanner 123 or PC 121. Similarly, video messages can be determined from the signaling or protocol use from a VCR 124 or camcorder 125. Finally, a text message can be determined from the signaling used by a PC or other device from which the facsimile message originates.

Thereafter in step 209 in response to the user selection the system would store video and audio messages from the user. Additionally, other types of messages such as facsimile, image, video and text messages could also be stored by the user. Such inputs would be possible, for example, if the user was making the call from a multimedia personal computer (PC) 140 or from a telephone station 120 having connection to the various multi-media apparatuses 121–125.

In step 211 the system inquires if the user wants the system to translate the stored message to the language of the intended message recipient (called party). Such an arrangement is advantageous because the translation can be done by the system after the user terminates the connection. Alternatively, as will be described in a later paragraph, the system optionally may be arranged whereby the recipient could translate the stored message into the language of the recipient. This second approach has the disadvantage in that the recipient would have to wait for the stored message to be translated while he or she is on-line.

If translation was requested then in step 213 it is performed by the system, and the original language message and its translation are stored in the user's selected location, e.g., the called party's mailbox. See, for example, user 1 has a message 1 which is stored in both English (E) and French (F). Thereafter, the connection terminates in step 215. If no translation was requested then the user's message is stored in the called party's mailbox in the original language, in step 212, and the connection ends in step 215.

In step 205 if the user is not at a video telephone, then the system outputs audio prompts in step 231 to guide the user in storing audio messages. In step 233 the user stores the audio message. Optionally, the user can also store facsimile, image, text or video messages in step 233. In such an arrangement the audio prompts of step 231 would output audio signals indicating the user's selection possibilities as shown in table 410.

In step 211 the system asks if the user would like to store the audio message in the language of the message recipient. If so, then in step 213 the system translates the message and stores it and the connection is terminated in step 215. If no translation is desired in step 211 then the message is stored in table 420, step 212, and the connection is terminated in step 215.

With reference to FIG. 3 we describe how a user (or called party) can retrieve messages from the multimedia system of FIG. 1.

In step 301 the system receives a user's call to retrieve his or her messages. In step 303 the system outputs a video/audio prompt (table 400) to enable a user to select a language for subsequent video/audio prompts to the user. Alternatively, as previously described, the system can be arranged to determine the language by accessing either an administrative table 430 which identifies the user's station number and the user's preferred language or a user table 420 which identifies the users themselves from their login/password and their preferred language.

In step 305 the system prompts the user to select a communication format, e.g., to identify if he/she is at a video terminal. Alternatively, as previously described, the system can interactively determine the terminal type by communicating with the terminal. Additionally, the terminal type could also be determined by accessing an administrative table 430 which identifies the terminal type or communication format (i.e., the message type).

Optionally, step 303 could be performed following step 305 whereby the system would use video prompts to determine which language the user could select.

If the user indicates he or she is calling from a video terminal in step 305, then in step 305 he/she receives a video prompt requesting him to log in, step 307, and enters his or her password, step 309. If the login/password procedure is invalid, in step 310, the process ends. If the login/password procedure is valid, then in step 311 the system outputs a video menu prompt describing the various message types (i.e., the communication format of the message) which the user can obtain. This video menu prompt would appear as shown in table 410. If help is needed the user can press *H.

In step 315, if multiple messages exist for a user, in table 420, then that user can select which of the plurality of messages is desired. The user then enables his/her terminal to receive the message. The user may also select to forward a message to another telephone number, to broadcast the message to several others or to delete the message.

In step 317, the system accesses table 420 to obtain the message selected by the user and the format converter processor 117 converts the message type selected by the user in step 311 (that is, fax, image, audio or text) to a video format for output to the user's video terminal. This procedure is used, for example, when the user or recipient of the message does not have the same type of terminal as the message sender. The format converter processor 117 would then convert the format from that of the message sender to that desired by the message recipient (for example from text to audio or video).

In step 319 the system prompts the user to select if he/she wants to receive the stored message in the original language (if a translation was selected in step 303). If so, the system accesses table 420 to obtain the original language version of the message. In step 321, the system prompts the user to select if he or she wants the stored message translated (if no translation was selected in step 303). If so, language translator processor 117 translates the language of the message (e.g., text in English) to the user selected language (e.g., text in French).

Thereafter, in step 323 the system outputs the stored message in the user selected language. This stored message would be outputted to the user's terminal.

If in step 305 if the user indicated that he/she is not at a video terminal then the user receives an audio prompt to "log in" in step 337. Thereafter, in step 339, the user is prompted to enters his or her password. Again, in step 310 the system determines if the login/password process was valid. If it was, then step 341 is performed, otherwise, the procedure ends. In step 341 the system queries the user to select the message type (e.g., facsimile, video, etc.) or to press *H for help in setting up the user's terminal to receive the message type.

In step 345 the system enables the user to select which message to output (if a plurality of messages have been received for that user). The user then enables his/her terminal to receive the message. The system also queries if the user wants to forward the message to another telephone, broadcast the message to others, or delete the message.

In step 347, the system accesses table 420 to obtain the message selected by the user and converts the message to the type selected by the user. Thereafter the system outputs the stored message type to the user's terminal.

In step 349 the system prompts the user to select if he/she wants to receive the stored message in the original language (if a translation was selected in step 303). If so, the system accesses table 420 to obtain the original language version of the message. In step 351 the system prompts the caller to select if he or she wants the stored message translated (if no translation was selected in step 303). If so, language translator processor 117 translates the language of the message to the user selected language.

Thereafter, in step 353 the system outputs the stored message in the user selected language. The user's terminal may be a telephone having an adjunct such as a facsimile machine, scanner, VCR, camcorder or PC which could receive the traditional message types.

What has been described is merely illustrative of the application of the principles of the present invention. Other arrangements and methods can be implemented by those skilled in the art without departing from the spirit and scope of the present invention.

I claim:

1. A multi-media messaging system for storing multi-media messages and enabling a user access to his or her own mailbox, comprising table means for storing user messages, at least one user message including a message communication format field and a message language type field;

means for receiving a user call requesting access to said system;

means for prompting the user to select a communication format for communications from said system to said user;

means for accessing said system to obtain a stored user message and for converting said user message to the selected communication format;

means for outputting said stored user message to the user in the selected communication format; and wherein said means for prompting enables the user to select a prompt language of said selected communication format.

2. The system of claim 1 including means for prompting, when the user selected prompt language is different from the language of a stored user message, the user to select the original language of the stored message to be outputted by said outputting means.

3. The system of claim 1 including means for enabling the user to access said system only after the user has verified his/her identity.

4. The system of claim 1 further including means for transferring said user call to a user identified communication line prior to outputting said stored user message.

5. A method of operating a multi-media messaging system which stores multi-media messages and enables a user access to his or her own mailbox, comprising the steps of storing user messages in a table, at least one user message including a message communication format field and a message language type field, receiving a user call requesting access to said system, prompting the user to select a prompt language for a communication format for communications from said system to said user, accessing said system to obtain a stored user message and for converting said user message to the selected communication format, and outputting said stored user message to the user in the selected prompt language for the communication format.

* * * * *